US012248259B2

(12) United States Patent
Tsuchihashi

(10) Patent No.: US 12,248,259 B2
(45) Date of Patent: Mar. 11, 2025

(54) IMAGE HEATING DEVICE AND IMAGE FORMING APPARATUS

(71) Applicant: Canon Kabushiki Kaisha, Tokyo (JP)

(72) Inventor: Naoto Tsuchihashi, Meridian, ID (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/324,223

(22) Filed: May 26, 2023

(65) Prior Publication Data

US 2023/0393498 A1 Dec. 7, 2023

(30) Foreign Application Priority Data

Jun. 6, 2022 (JP) ................................ 2022-091287

(51) Int. Cl.
*G03G 15/20* (2006.01)

(52) U.S. Cl.
CPC ..... *G03G 15/2017* (2013.01); *G03G 15/2039* (2013.01); *G03G 15/2057* (2013.01)

(58) Field of Classification Search
CPC ........... G03G 15/2057; G03G 15/2039; G03G 15/2017
See application file for complete search history.

(56) References Cited

U.S. PATENT DOCUMENTS 10,969,720 B1 * 4/2021 Koyanagi .......... G03G 15/2042
11,644,774 B2 5/2023 Shimura et al.
2005/0220508 A1 * 10/2005 Masubuchi ........ G03G 15/2053 399/329
2011/0070006 A1 * 3/2011 Sone .................. G03G 15/2039 399/333
2012/0087692 A1 * 4/2012 Choi .................. G03G 15/2064 399/328
2014/0078693 A1 * 3/2014 Feeney .................... H05B 3/34 156/60
2014/0138372 A1 * 5/2014 Ogura ................ G03G 15/2042 399/329
2015/0139708 A1 * 5/2015 Shimura ............ G03G 15/2042 399/329
2016/0139551 A1 * 5/2016 Narahara ........... G03G 15/2042 399/33
2017/0371283 A1 * 12/2017 Fujita ................. G03G 15/2042
(Continued)

FOREIGN PATENT DOCUMENTS

JP 2017054071 A 3/2017
JP 2020024371 A 2/2020
JP 2020034940 A 3/2020

*Primary Examiner* — Sevan A Aydin
(74) *Attorney, Agent, or Firm* — Venable LLP

(57) ABSTRACT

An image heating device is provided that includes: a film; a heater with a heat generator; a support member; a roller; and an electrical wire that is joined to the heater using a joining material; and a thermal conductive member that is in contact with the heater and the support member. The heater includes a first region in which the heat generator is provided, a second region in which the joining material is provided, and a third region between the first region and the second region. A surface of the third region of the heater that faces a seat of the support member includes a region that is not in contact with the support member. The thermal conductive member is in contact with the heater and the support member in at least one of the second region and the third region of the heater.

15 Claims, 5 Drawing Sheets

(56) References Cited

U.S. PATENT DOCUMENTS

| | | | | |
|---|---|---|---|---|
| 2018/0024480 | A1* | 1/2018 | Fujita | G03G 15/2039<br>399/33 |
| 2018/0267441 | A1* | 9/2018 | Koyanagi | G03G 15/2017 |
| 2019/0317434 | A1* | 10/2019 | Ogura | G03G 15/5062 |
| 2019/0334268 | A1* | 10/2019 | Nakano | H01R 12/79 |
| 2019/0361379 | A1* | 11/2019 | Koyama | G03G 15/206 |
| 2020/0182417 | A1* | 6/2020 | Kager | B60Q 1/30 |
| 2020/0240594 | A1* | 7/2020 | Jiang | H05B 45/3578 |
| 2020/0285180 | A1* | 9/2020 | Matsuda | G03G 15/2064 |
| 2020/0401070 | A1* | 12/2020 | Sekimizu | G03G 15/2053 |
| 2021/0165348 | A1* | 6/2021 | Shimada | G03G 15/2064 |
| 2021/0263457 | A1* | 8/2021 | Ubagai | G03G 15/2064 |
| 2021/0333735 | A1* | 10/2021 | Obata | G03G 21/1652 |
| 2022/0276594 | A1* | 9/2022 | Ikeno | G03G 15/2053 |
| 2022/0404746 | A1* | 12/2022 | Maruyama | G03G 15/2028 |

* cited by examiner

IMAGE HEATING DEVICE AND IMAGE FORMING APPARATUS

BACKGROUND OF THE INVENTION

Field of the Invention

The present invention relates to an image heating device such as a fixing apparatus that is installed in an image forming apparatus such as a photocopier or printer using an electrophotographic method or an electrostatic recording method, or a glossing apparatus that reheats a toner image fixed on a recording material to improve the glossiness of the toner image. The present invention further relates to an image forming apparatus including an image heating device.

Description of the Related Art

Conventionally, as an image heating device that is installed in an image forming apparatus such as a photocopier or a printer, there is a fixing apparatus including a film that transfers heat to a recording material, a heater that is in contact with an inner surface of the film, and a roller that forms a nip portion together with the film. Japanese Patent Application Publication No. 2017-054071 discloses, as an example of such an image heating device, a heater that includes a plurality of heat generating blocks lined up in a longitudinal direction of the heater on a substrate of the heater, each heat generating block including a temperature detection element.

SUMMARY OF THE INVENTION

In the configuration disclosed in Japanese Patent Application Publication No. 2017-054071, it is conceivable that a flexible sheet such as a Flexible Printed Circuit (FPC) or a Flexible Flat Cable (FFC) is used as an electrical wire that connects the heater and a control substrate. It is also conceivable that an electrical connection between the flexible sheet and the heater is soldered. In this case, when the heater generates heat and stops generating heat, the temperature of the soldered joint portion that is in contact with the heater increases and decreases in a repeated manner. Particularly, when the heater has a structure with a high temperature ramp rate such as a configuration in which a heater seat of a heater support member has a region that is not in contact with the heater, the temperature of the joint portion is also ramped up rapidly and thus thermal fatigue is likely to accumulate in the joint portion. If the joint portion cracks due to cumulative thermal fatigue, a problem may occur in which the electrical connection is interrupted, or the flexible sheet is detached.

It is an object of the present invention to provide an image heating device in which heat transfer to a joint portion between a heater and an electrical wire is suppressed.

In order to solve the above-described problem, an image heating device of the present invention includes:

- a film that is tubular;
- a heater with a heat generator, the heater being elongated in a generatrix direction of the film, and being arranged in an inner space of the film along the generatrix direction of the film;
- a support member that is arranged in the inner space of the film, and supports the heater;
- a roller that is in contact with an outer circumferential surface of the film, and forms a nip portion between the roller and the film, the nip portion being configured to hold the recording material between the roller and the film; and
- an electrical wire that is joined to the heater using a joining material, and is electrically connected to the heater,
- wherein the image heating device further includes, between the heater and the support member, a thermal conductive member that is in contact with the heater and the support member,
- wherein the heater includes, in the generatrix direction, a first region in which the heat generator is provided, a second region in which the joining material is provided, and a third region between the first region and the second region,
- wherein a surface of the third region of the heater that faces a seat of the support member includes a region that is not in contact with the support member, and
- wherein the thermal conductive member is in contact with the heater and the support member in at least one of the second region and the third region of the heater.

With this configuration, according to the present invention, it is possible to provide an image heating device in which heat transfer to a joint portion between a heater and an electrical wire is suppressed.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

Image Forming Apparatus 100

Figure 1:
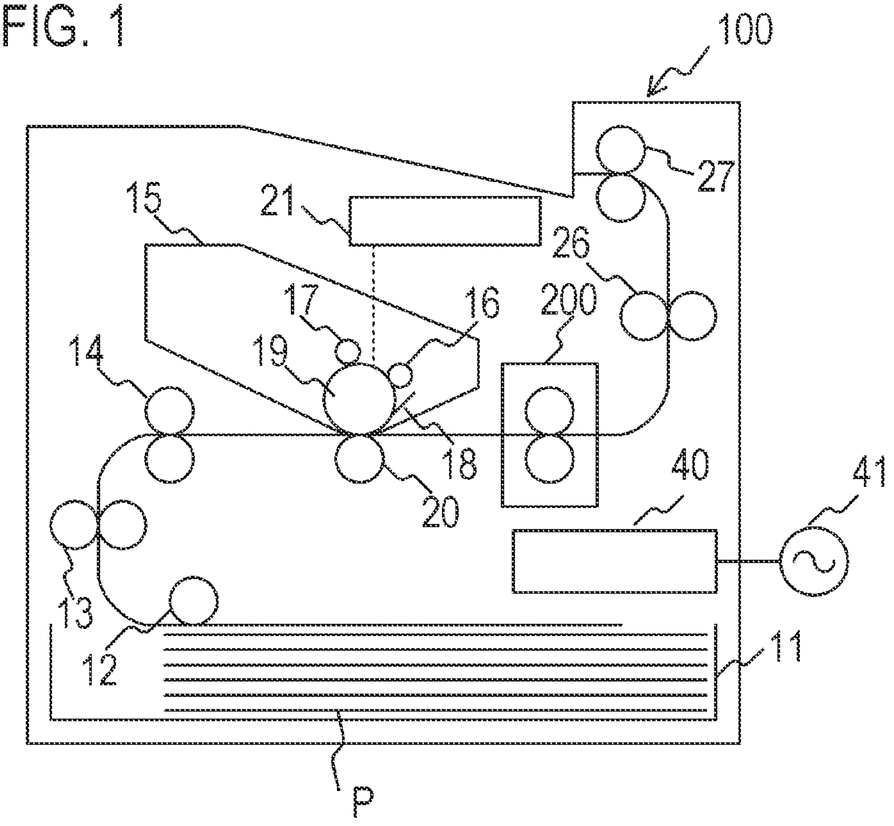
FIG. 1 is a schematic cross-sectional view of an image forming apparatus according to Embodiment 1.

The following will first describe a schematic configuration of an image forming apparatus 100 according to the present embodiment with reference to FIG. 1. FIG. 1 is a schematic cross-sectional view of the image forming apparatus 100, which is a laser printer using an electrophotographic recording technique. When the image forming apparatus 100 receives a print signal, a scanner unit 21 emits laser light modulated according to image information, and scans a photo conductor 19 electrically charged to a predetermined polarity by a charging roller 16. With this, an electrostatic latent image is formed on the photo conductor 19. A tonner is supplied from a development roller 17 to this electrostatic latent image, and a toner image that corresponds to the image information is formed on the photo conductor 19. The toner image is transferred to a recording material P, and then the photo conductor 19 is cleaned up by a cleaner 18.

The recording material P stacked on a paper cassette (paper feed unit) 11 is fed one by one by a pick-up roller 12, and is conveyed by a roller 13 toward a registration roller 14. Furthermore, the recording material P is conveyed from the registration roller 14 to a transfer position formed by the photo conductor 19 and a transfer roller 20 at a timing at which the toner image on the photo conductor 19 reaches the transfer position. While the recording material P passes through the transfer position, the toner image on the photo conductor 19 is transferred to the recording material P. Then, the recording material P is heated by a fixing apparatus 200, and the toner image is thermally fixed to the recording material P. The fixing apparatus 200, which serves as an image heating device, is supplied with power from a control circuit 40, which serves as a control unit connected to a commercially available AC source 41. The recording material P carrying the fixed toner image is discharged by rollers 26 and 27 to a tray provided in an upper portion of the image forming apparatus 100.

The above-described photo conductor 19, charging roller 16, scanner unit 21, development roller 17, and transfer roller 20 constitute an image forming unit for forming an unfixed image on the recording material P. Also, a cartridge 15 including the photo conductor 19, the charging roller 16, the development roller 17, and the cleaner 18 serves as a replacement unit, and is detachable from the image forming apparatus 100.

Fixing Apparatus 200

Figure 2A:
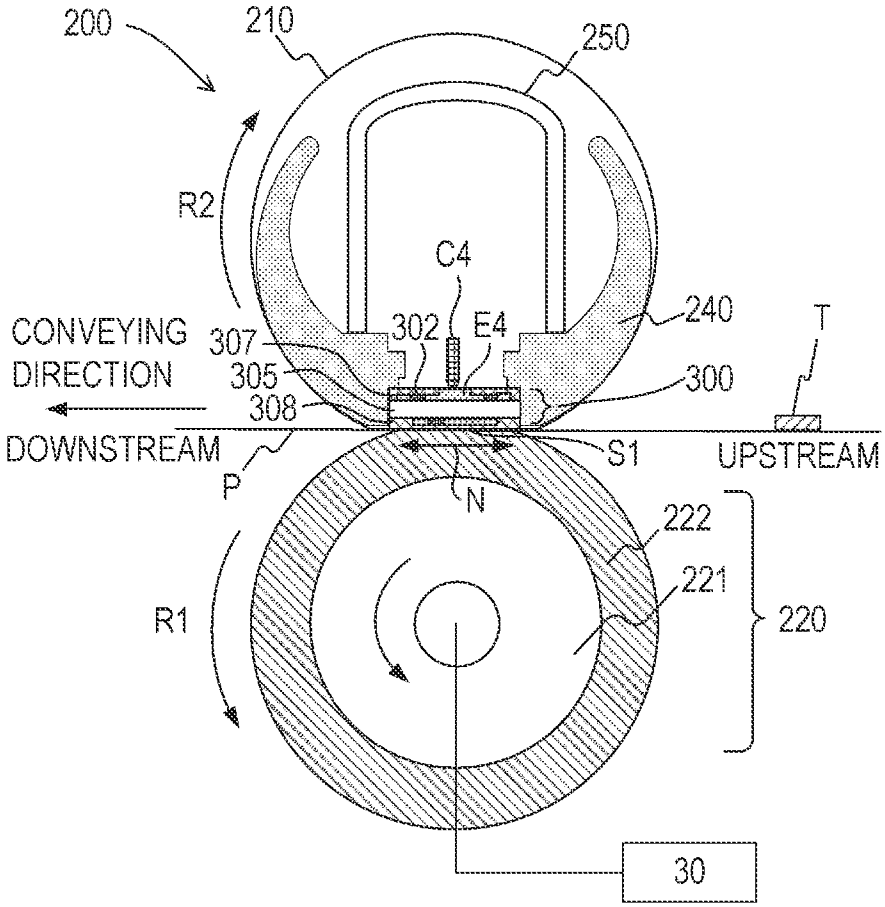
FIGS. 2A and 2B are schematic diagrams illustrating a fixing apparatus according to Embodiment 1.
Figure 2B:
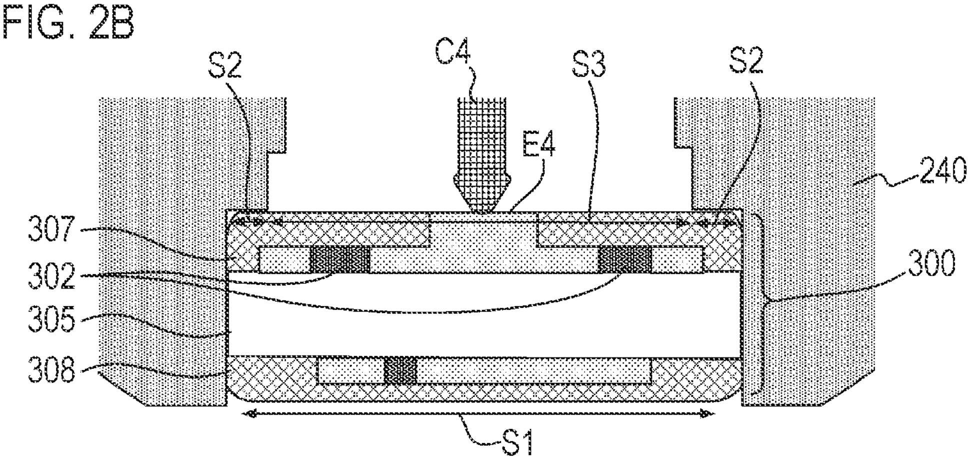

The following will describe a schematic configuration of the fixing apparatus 200, which serves as a fixing unit configured to fix an image formed on the recording material P to the recording material P, with reference to FIGS. 2A and 2B. FIG. 2A is a schematic cross-sectional view of the fixing apparatus 200 according to the present embodiment. The fixing apparatus 200 includes: a fixing film 210 serving as a heating rotation member; a heater 300 having a contact surface S1 that faces and is in contact with an inner surface of the fixing film 210; and a pressure roller 220 serving as a pressure rotation member that forms a fixing nip portion N between the pressure roller 220 and the fixing film 210. The fixing nip portion N of the present embodiment is formed by the heater 300 and the pressure roller 220 via the fixing film 210, and the contact surface S1 of the heater 300 serves as a nip portion forming surface. Also, on a side opposite to the contact surface S1 in contact with the inner surface of the fixing film 210, a heater support member 240 is provided that serves as a support member for supporting the heater 300. A metal stay 250 is provided on, while being in contact with, a surface of the heater support member 240 that is opposite to the seat on which the heater 300 is supported. The metal stay 250 is biased toward the pressure roller 220 by a not-shown pressure mechanism. With this biasing force, the fixing nip portion N is formed.

The fixing film 210 is a tubular multi-layer film, and as a base layer of the fixing film 210, a heat-resistant resin such as polyimide with a thickness of about 50 to 100 μm, or metal such as stainless steel with a thickness of about 20 to 50 μm can be used. The surface of the fixing film 210 is covered with a heat-resistant resin in order to prevent a toner from adhering to the fixing film 210 or ensure that a toner is separated from the recording material P, and thus releasability is realized. An example of the heat-resistant resin may be tetrafluoroethylene perfluoroalkyl vinyl ether copolymer (PFA) with a thickness of about 10 to 50 μm. Furthermore, particularly in an apparatus for forming a color image, heat-resistant rubber serving as an elastic layer may be provided between the base layer and a release layer to improve image quality. An example of the heat-resistant rubber is silicone rubber with a thickness of about 100 to 400 μm and a thermal conductivity of about 0.2 to 3.0 W/m·K.

In the present embodiment, polyimide with a thickness of 60 μm is used as the base layer of the fixing film 210, silicone rubber with a thickness of 300 μm and a thermal conductivity of 1.6 W/m·K is used as the elastic layer, and PFA with a thickness of 30 μm is used as the release layer, in view of thermal responsiveness, image quality, durability, and the like.

The pressure roller 220 includes: a core metal 221 made of a material such as iron or aluminum; and an elastic layer 222 made of a material such as silicone rubber. The heater support member 240 also has a guide function of guiding the rotation of the fixing film 210 by contact with the inner surface of the fixing film 210. The pressure roller 220 is powered by a motor 30 and is rotated in a direction indicated by an arrow R1. In response to the rotation of the pressure roller 220, the fixing film 210 is driven and is rotated in a direction indicated by an arrow R2, since the pressure roller 220 is in contact with an outer circumferential surface of the fixing film 210. Then, the recording material P interposed between the pressure roller 220 and the fixing film 210 is conveyed in a conveying direction in accordance with the rotations of the pressure roller 220 and fixing film 210. When, in the fixing nip portion N, the recording material P is conveyed while being interposed between pressure roller 220 and fixing film 210 and is heated by the fixing film 210, the unfixed toner image T on the recording material P is fixed.

The heater 300 is a ceramic heater that includes a ceramic substrate 305 and at least one heat generator 302 on the substrate 305, and heats the fixing film 210 with heat generated by the heat generator 302. The heater 300 of the present embodiment is a member that is elongated in a direction parallel to the width direction of the recording material P and to a rotation axis direction (generatrix direction) of the pressure roller 220 or the fixing film 210, and the heater 300 is arranged on an inner space of the fixing film 210. The heater 300 includes a surface protection layer 308 provided on the fixing nip portion N side, and a surface protection layer 307 provided on a side opposite to the fixing nip portion N side. Although details will be described later, a plurality of electrodes E electrically connected to a plurality of heat generators 302 are provided on a side of the heater 300 opposite to a side facing the fixing nip portion N, and the fixing apparatus 200 includes a plurality of electrical contacts C that are respectively in contact with the plurality of electrodes E of the heater 300. As representative examples of them, an electrode E4 and an electrical contact C4 are shown in FIG. 2A.

FIG. 2B is an enlarged view showing the vicinity of the heater 300 in the FIG. 2A. The heater 300 includes contact regions S2 that are in contact with the heater support member 240 on a side opposite to the contact surface S1 in contact with the fixing film 210. The heater 300 also includes a non-contact region S3 that is not in contact with the heater support member 240. Although details will be described later, in the non-contact region S3, there is no component in contact with the heater 300, except for an adhesive and the electrodes, and heat is unlikely to be transferred from the heater 300 to the heater support member 240.

Heater 300

Figures 3A, 3B:
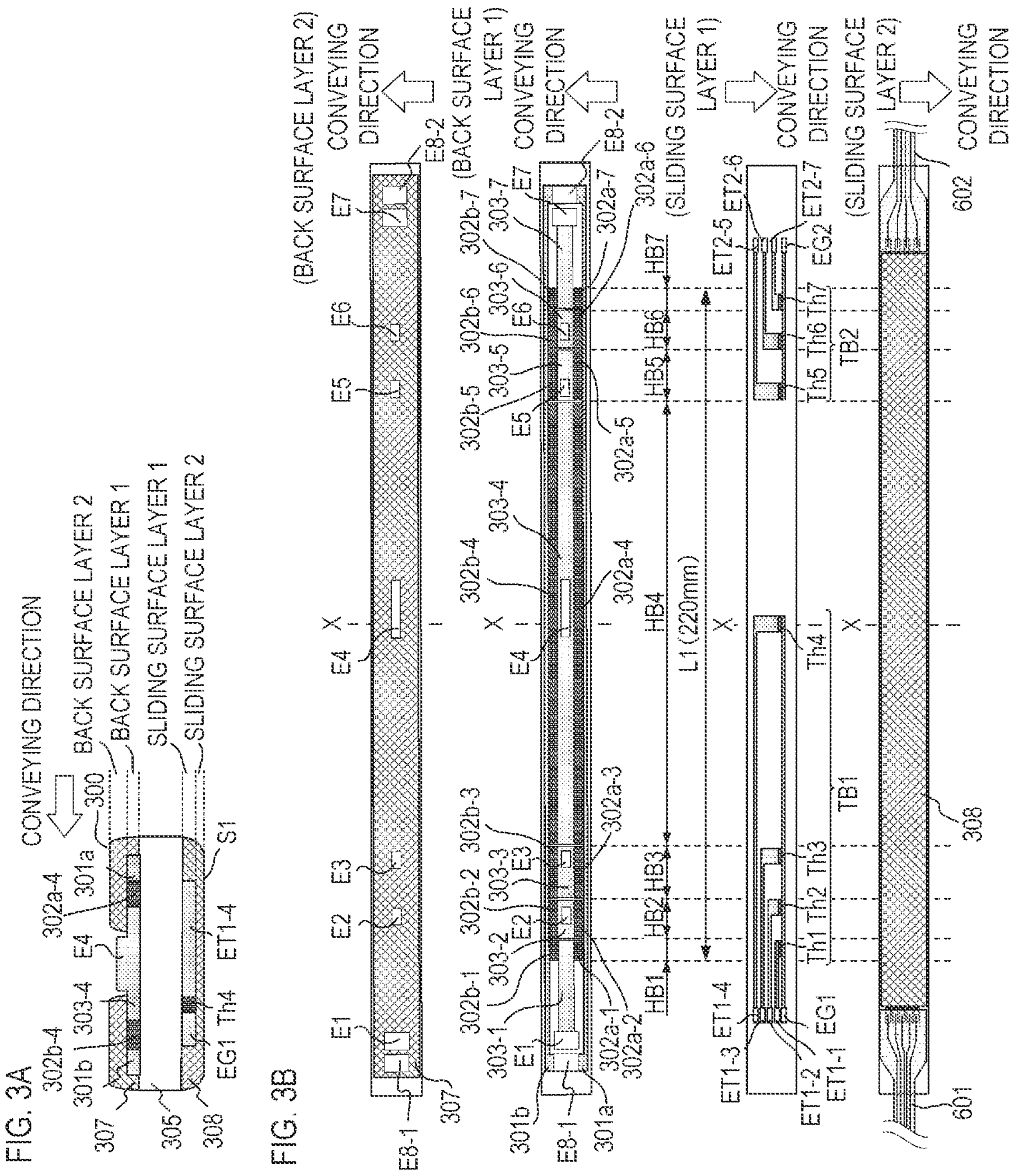
FIGS. 3A and 3B are diagrams illustrating a configuration of a heater.

The following will describe a configuration of the heater 300 in detail with reference to FIGS. 3A and 3B. FIG. 3A is a schematic cross-sectional view of a layer configuration of the heater 300 according to the present embodiment, and FIG. 3B is a diagram showing configurations of layers of the heater 300. In FIG. 3A, a cross section of a portion in the vicinity of a conveying reference position X shown in FIG. 3B is shown. The conveying reference position X is defined as a reference position used when the recording material P is conveyed. In the present embodiment, the recording material P is conveyed in a manner such that the central portion of the recording material P in the width direction of the recording material P orthogonal to the conveying direction conforms to the conveying reference position X.

The surface protection layer 308 that is provided on the substrate 305 and slides with respect to the fixing film 210 can be broadly divided into a sliding surface layer 1 and a sliding surface layer 2 in this order from the substrate 305 based on a layer configuration of the surface protection layer 308. Similarly, the surface protection layer 307 that is provided on the substrate 305 on a side opposite to the surface protection layer 308 can be broadly divided into a back surface layer 1 and a back surface layer 2 in this order from the substrate 305 based on a layer configuration of the surface protection layer 307. The layer configurations will be described in detail later.

The heater 300 includes a first conductor 301 and a second conductor 303 that are provided on the surface on the back surface layer side, that is, on the back surface layer 1. The first conductor 301 (301*a* and 301*b*) extends in the longitudinal direction of the heater 300. The first conductor 301 includes a conductor 301*a* arranged on the upstream side in the conveying direction of the recording material P, and a conductor 301*b* arranged on the downstream side. The second conductor 303 (303-4 in the vicinity of the conveying reference position X) is provided at a position different from the first conductor 301 in a short-side direction of the heater 300 that is orthogonal to the longitudinal direction thereof, and extends in the longitudinal direction of the heater 300.

Between the first conductor 301 and the second conductor 303, the heat generator 302 is provided that generates heat upon being supplied with power via the first conductor 301 and the second conductor 303. The heat generator 302 includes a heat generator 302*a* (302*a*-4 in the vicinity of the conveying reference position X) arranged on the upstream side in the conveying direction of the recording material P in the present embodiment, and a heat generator 302*b* (302*b*-4 in the vicinity of the conveying reference position X) arranged on the downstream side.

Also, the insulating surface protection layer 307 (glass in the present embodiment) of the back surface layer 2 of the heater 300 covers the heat generator 302, the first conductor 301, and the second conductor 303 (303-4 in the vicinity of the conveying reference position X) without covering the electrode portions (E4 in the vicinity of the conveying reference position X).

FIG. 3B shows the layers (the back surface layer 2, the back surface layer 1, the sliding surface layer 1, and the sliding surface layer 2) of the heater 300 in a plane view. The back surface layer 1 of the heater 300 includes a plurality of heat generating blocks provided in the longitudinal direction of the heater 300, each heat generating block being constituted by a pair of first conductor 301, second conductor 303, and heat generator 302. The heater 300 of the present embodiment includes, in the longitudinal direction of the heater 300, heat generating blocks HB1 to HB7, which correspond to seven heating regions in total. The heat generating blocks HB1 to HB7 respectively include the heat generators 302*a*-1 to 302*a*-7 and the heat generators 302*b*-1 to 302*b*-7 that are formed symmetrically in the short-side direction of the heater 300. The first conductor 301 is constituted by the conductors 301*a* connected to the heat generators (302*a*-1 to 302*a*-7), and the conductors 301*b* connected to the heat generators (302*b*-1 to 302*b*-7). Similarly, the second conductor 303 is divided into seven conductors 303-1 to 303-7 that correspond to the seven heat generating blocks HB1 to HB7.

In the present embodiment, the conveying reference position X is located in the center of the heat generating block HB4, and the width of the heat generating block HB4 in the longitudinal direction of the heater 300 is set to 150 mm in order to cover the paper width (148 mm) of the recording material P of the A5 size. Also, the heat generating blocks HB3 and HB5 each have a width of 17 mm in the longitudinal direction. This is because, in order for a heat generating region of the heat generating blocks HB3 to HB5 to cover the paper width (182 mm) of the B5 size, the width of the heat generating region in the longitudinal direction is set to 184 mm, which is slightly larger than the paper width. The heat generating blocks HB2 and HB6 each have a width of 14 mm in the longitudinal direction. This is because, in order for a heat generating region of the heat generating blocks HB2 to HB6 to cover the paper width (210 mm) of the A4 size, the width of the heat generating region in the longitudinal direction is set to 212 mm, which is slightly larger than the paper width. The heat generating blocks HB1 and HB7 each have a width of 4 mm in the longitudinal direction. This is because, in order for the heat generating blocks HB1 to HB7 to cover the paper width (215.9 mm) of the LTR size, the total width of the heat generating blocks HB1 to HB7 is set to 220 mm, which is larger than the paper width. Hereinafter, a description is given assuming that the region of the heat generating blocks HB1 to HB7 having the width of 220 mm in the longitudinal direction of the heater 300 is defined as a heat generating region L1 of the heater (see FIG. 3B).

To supply the heater 300 with power from the control circuit 40, electrical contacts C1 to C7, C8-1, and C8-2 are respectively connected to the electrodes E1 to E7, E8-1, and E8-2. The electrodes E1 to E7 are electrodes for supplying power to the heat generating blocks HB1 to HB7 via the conductors 303-1 to 303-7. The electrodes E8-1 and E8-2 are common electrodes that are used to supply power to the seven heat generating blocks HB1 to HB7 via the conductors 301*a* and the conductor 301*b*, and to which common electrical contacts are connected. Note that although, in the present embodiment, the electrodes E8-1 and E8-2 are provided at two ends of the heater 300 in the longitudinal direction, a configuration is also possible in which, for example, only the electrode E8-1 is provided at one of the two ends, or different electrodes are provided between the upstream side and the downstream side in the conveying direction of the recording material P.

Also, the surface protection layer 307 of the back surface layer 2 of the heater 300 is formed without covering the positions of the electrodes E1 to E7, E8-1, and E8-2, so that it is possible to connect the electrical contacts C1 to C7, C8-1, and C8-2 for power supply, which will be described in detail layer, to the electrodes from the back surface layer side of the heater 300. That is to say, the configuration is such that power can be supplied from the back surface layer side of the heater 300. Also, the heater 300 is configured to independently control power to be supplied to at least one heat generating block among the plurality of heat generating blocks, and power to be supplied to the remaining heat generating blocks. That is to say, with the control circuit 40, the temperatures of the heat generating blocks HB1 to HB7 are respectively detected, and temperature control of the heat generators 302*a*-1 to 302*a*-7 and 302*b*-1 to 302*b*-7 is independently performed.

The sliding surface layer 1 on the sliding surface side of the heater 300 includes thermistors Th1 to Th7 serving as temperature detection elements for respectively detecting the temperature of the heat generating blocks HB1 to HB7 of the heater 300. The thermistors Th1 to Th7 of the present embodiment are made of a thin material having NTC (Negative Temperature Coefficient) characteristics laid on the substrate. Note that the material may also have PTC (Positive Temperature Coefficient) characteristics. Since all of the heat generating blocks HB1 to HB7 include the thermistor Th, it is possible to detect the temperatures of all of the heat generating blocks HB by detecting resistance values of the thermistors Th.

The sliding surface layer 1 includes, as electrical contacts for electrifying the four thermistors Th1 to Th4, conductors ET1-1 to ET1-4 for detecting resistance values of the thermistors Th1 to Th4, and a common conductor EG1 that is used in common for the thermistors Th1 to Th4. The thermistors Th1 to Th4, the conductors ET1-1 to ET1-4, and the common conductor EG1 constitute a thermistor block TB1.

Similarly, for electrifying the three thermistors Th5 to Th7, the sliding surface layer 1 includes conductors ET2-5 to ET2-7 for detecting resistance values of the thermistors Th5 to Th7, and a conductor EG2 that is used in common for the thermistors Th5 to Th7. The thermistors Th5 to Th7, the conductors ET2-5 to ET2-7, and the common conductor EG2 constitute a thermistor block TB2.

The sliding surface layer 2 on the sliding surface side of the heater 300 includes the slidable surface protection layer 308 (glass in the present embodiment). Note however that the surface protection layer 308 does not cover the conductors ET1-1 to ET1-4, ET2-5 to ET2-7 and the common conductors EG1 and EG2, which are electrical contacts provided at both ends of the heater 300 in the longitudinal direction. This is because an FPC (Flexible Printed Circuits) is joined to the conductors ET1-1 to ET1-4, ET2-5 to ET2-7 and the common conductors EG1 and EG2, which are provided at both ends of the heater 300 in the longitudinal direction. In the present embodiment, an FPC 601 and an FPC 602 are provided as electrical wires for connecting the thermistors Th of the heater 300 and the control circuit 40. The FPC 601 and the FPC 602 have the same conductor patterns as those of the conductors ET1-1 to ET1-4, ET2-5 to ET2-7 and the common conductor EG1 connected to the thermistors Th. The FPC 601 is joined to the conductors ET1-1 to ET1-4 and the common conductor EG1, and the FPC 602 is joined to the conductor ET2-5 to ET2-7 and the common conductor RG2, so that the FPC 601 and the FPC 602 function as the electrical wires.

As in the present embodiment, if a heat generating region with heat generators is divided into a plurality of regions, the number of temperature detection elements increases, and the number of electrical contacts at the ends of the heater also increases. There is also a limitation in the area at the ends of the heater in which electrical contacts are provided, and if, as described above, a large number of electrical contacts are to be provided at the ends of the heater, the electrical contacts need to be minimized. To do so, the electrical wires to be connected to the electrical contacts at the ends of the heater also need to be minimized. Therefore, it is preferable to use, as the electrical wire to be connected to the electrical contacts, a flexible sheet such as an FPC or an FFC (Flexible Flat Cable) that enables minimization of a connection to the electrical contact or a conduction path.

The FPC 601 and the FPC 602 are conductor pattern protection members that serve also as terminal connecting connectors. Here, at the ends of the heater 300 in the longitudinal direction, the conductors ET1-1 to ET1-4 and the common conductor EG1 are aligned at equal interval in the short-side direction of the heater 300. Similarly, at the ends of the heater 300 in the longitudinal direction, the conductors ET2-5 to ET2-7, and the common conductor EG2 are aligned at equal interval in the short-side direction of the heater 300. The conductors ET1-1 to ET1-4, and the common conductor EG1 are arranged so as to overlap with a conductive wire connection portion of the FPC 601, and the conductor ET2-5 to ET2-7 and the common conductor EG2 are arranged so as to overlap with a conductive wire connection portion of the FPC 602.

The FPC 601 and the FPC 602 of the present embodiment have a configuration in which a copper foil pattern serving as a conductive wire is interposed between polyimide films via an adhesive layer, and the copper foil pattern is exposed from the conductive wire connection portion. By joining the conductive wire-exposed portions of the FPC 601 and the FPC 602 to the conductors (ET1-1 to ET1-4 and ET2-5 to ET2-7) and the common conductors (EG1 and EG2) of the heater 300 using a solder serving as an adhesive, the FPCs and the conductors are connected.

Joint Configuration of Heater 300 and Heater Support Member 240

Figure 4A:
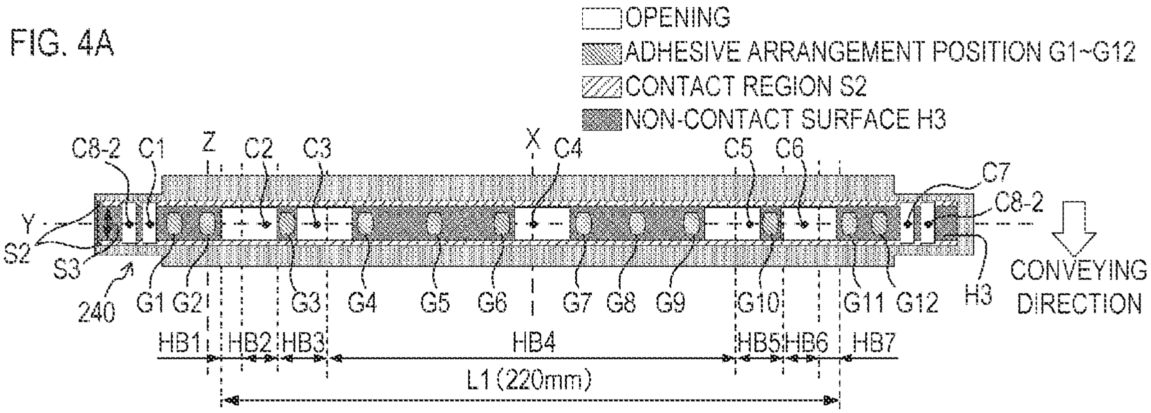
FIGS. 4A to 4D are diagrams illustrating configurations of a heater support member and the heater.
Figure 4B:
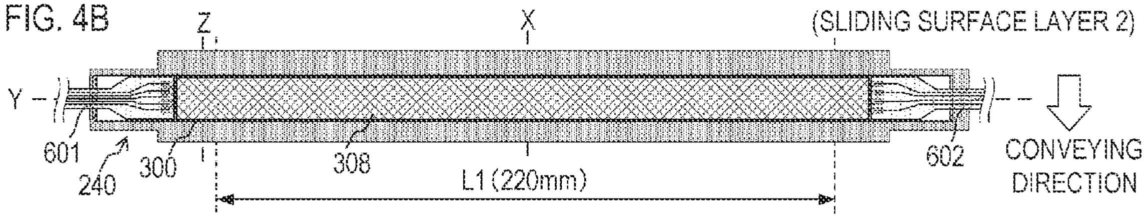
Figure 4C:
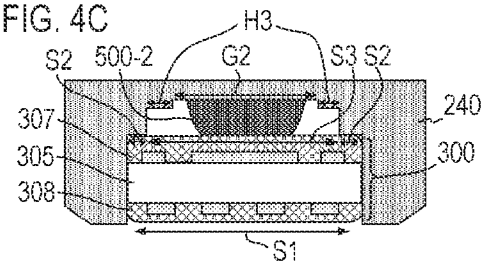
Figure 4D:
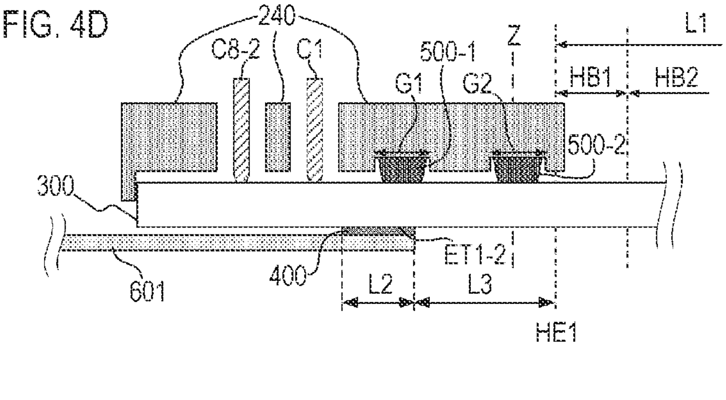

The following will describe a joint configuration of the heater 300 and the heater support member 240 with reference to FIGS. 4A to 4D. FIG. 4A is a diagram showing the heater support member 240 where the heater 300 is removed, and showing a portion of the heater support member 240 that faces the back surface layer 2 of the heater 300. FIG. 4B is a diagram showing a state in which the heater 300, and the FPC 601 and FPC 602 are provided on the heater support member 240. FIG. 4C is a cross-sectional view of a portion in the vicinity of the heater 300, taken along a position Z in the longitudinal direction of the heater 300 in FIG. 4A. FIG. 4D is a cross-sectional view of a portion in the vicinity of the longitudinal end of the heater 300 on the FPC 601 side, viewed at a central position Y in the short-side direction of the heater 300.

The electrical contacts C1 to C7, C8-1, and C8-2 are connected to the electrodes E1 to E7, E8-1, and E8-2 of the heater 300. As shown in FIG. 4A, the heater support member 240 is open at positions at which the electrical contacts C1 to C7, C8-1, and C8-2 are arranged. With such a configuration, the electrodes E1 to E7, E8-1, and E8-2 can be electrically connected to the electrical contacts C1 to C7, C8-1, and C8-2. Note that in FIG. 4A, for clear illustration of the openings, the portions of the heater support member 240 other than the openings are filled or hatched.

In the present embodiment, an adhesive 500 is used to adhere the heater 300 to the heater support member 240. This is because if the position of the heater is changed during image formation, a problem such as a defect in toner image fixation will occur. As in the present embodiment, in a configuration in which the heat generator is divided, and temperature adjustment is possible for each of the divided areas, a conveying region for the recording material P that is defined in the longitudinal direction of the heater 300 is determined based on information relating to the size of the recording material P, and a heat generation distribution that corresponds to the conveying region is formed. Accordingly, if the position of the heater 300 is changed in the longitudinal direction of the heater 300, an area that generates an insufficient amount of heat will be located in the conveying region for the recording material P, the toner image on the recording material P cannot be heated, and thus the toner image cannot be fixed to the recording material P. In order to prevent such a situation, the heater 300 is adhered to the heater support member 240. In FIG. 4A, twelve positions on the heater support member 240 at which the adhesive 500 is arranged are defined as adhesion positions G1 to G12, and are hatched.

In the present embodiment, the adhesion positions G1 to G12 of the heater support member 240 at which the adhesive 500 is arranged are aligned in the longitudinal direction of the heater 300. By arranging adhesives 500-1 to 500-12 at the respective adhesion positions G1 to G12, the heater 300 is adhered to the heater support member 240. The adhesive 500 of the present embodiment is heat-resistant adhesive made of silicone rubber. Also, the amount of the adhesive that is applied to the adhesion positions G1 to G12 is about 13 mg.

In FIG. 4A, the region of the heater support member 240 with which the contact regions S2 of the heater 300 are in contact when the heater 300 is arranged on the heater support member 240 is hatched. The contact regions S2 of the heater 300 are located at both ends of the heater 300 in the short-side direction as shown in FIG. 2B, and extend over almost entire region of the heater 300 in the longitudinal direction as shown in FIG. 4A. The contact regions S2 are the smallest area required to sufficiently support the heater 300 with the heater support member 240 when the heater 300 is pressed by the pressure roller 220 with the fixing film 210 and the like interposed therebetween.

Of the surface of the heater 300 that is opposite to the contact surface S1 in contact with the fixing film 210, the portion except for the contact regions S2 is defined as a non-contact region S3, which is not in contact with the heater support member 240 and in which there is no component in contact with the heater 300, except for the adhesive 500 and the electrodes. This is because, by reducing the contact area between the heater 300 and the heater support member 240, heat transfer from the heat generating region L1 to the heater support member 240 is reduced and heat of the heater is efficiently transferred to the fixing film 210. The non-contact region S3 is located between the contact regions S2 at both ends of the heater 300 in the short-side direction, and extends over the entire longitudinal region of the heater 300. Note that in the present embodiment, the non-contact region S3 extends to the ends of the heater 300 in the longitudinal direction, but it is sufficient that the non-contact region S3 extends at least to positions at which the heat generator 302 is located.

Furthermore, FIG. 4A shows a region of the non-contact region S3 excluding openings for the electrical contacts C and the adhesive arrangement positions G1 to G12, as a non-contact surface H3 of the heater support member 240 that is not in contact with the heater 300. The non-contact surface H3 is retracted from and is depressed with respect to the regions of the heater support member 240 with which the contact regions S2 of the heater are in contact, in order to avoid contact with the heater 300.

As shown in FIG. 4C, a counter sinking is provided at each of the adhesion positions G1 to G12 of the heater support member 240 to prevent the adhesive 500 from running out and flowing to an unintended region. That is to say, the positions of the heater support member 240 at which the adhesive 500 is provided are retracted from the non-contact surface H3, and are depressed in a direction apart from the heater 300.

The following will describe a joining material 400, which is a joint portion of the heater 300 and the FPC 601 shown in FIG. 4D. The joining material 400 of the present embodiment is solder that joins a conductive wire-exposed portion of the FPC 601 and a conductor ET1-2 of the heater 300. Note that the joining material 400 is not limited to solder, and any material can be used as long as it is conductive, is disposed between the heater 300 and the FPC 601, and joins them together. Also, in FIG. 4D, a heat generator end HE1, which is an end position in the heat generating region L1 (first region) of the heater 300 on the FPC 601 side in the longitudinal direction of the heater 300, is denoted by a dotted line. The heat generator end HE1 serves as an end of the heat generator 302*a*-1 and an end of the heat generator 302*b*-1 in the longitudinal direction of the heater 300. The heater 300 includes, in addition to the above-described heat generating region L1, a joint region L2 (second region) with which the joining material 400 is in contact, and an intermediate region L3 (third region) between the heat generating region L1 and the joint region L2, in the longitudinal direction of the heater 300. That is to say, the intermediate region L3 is a region between the heat generator 302 and the joining material 400 in the longitudinal direction of the heater 300.

As shown in FIG. 4D, the adhesive 500-2 provided at the adhesion position G2 is located in the intermediate region L3 in the longitudinal direction of the heater 300. On the other hand, the adhesive 500-1 provided at the adhesion position G1 extends over the boundary between the joint region L2 and the intermediate region L3 in the longitudinal direction of the heater 300.

The present embodiment of the present invention is characterized by a configuration in which the adhesives 500-1 and 500-2 are respectively arranged in the joint region L2 and the intermediate region L3 of the heater 300. It is sufficient that the adhesive is provided in at least one of the joint region L2 and the intermediate region L3. With this layout configuration of the adhesive 500, when the heat generator 302 is supplied with power and generates heat, heat transferred from the heat generator end HE1 via the substrate 305 of the heater 300 can be transferred to the heater support member 240 via the adhesives 500-1 and 500-2. Accordingly, it is possible to reduce the heat transferred to the joining material 400. Note that a cross section of a portion in the vicinity of the longitudinal end on the FPC 602 side has a symmetric structure with respect to that in FIG. 4D. That is to say, in the present embodiment, the joining materials 400 are provided on both sides of the heat generating region L1 in the longitudinal direction of the heater 300, and the joint region L2 and the intermediate region L3 are located on both sides of the heat generating region L1.

Thus, according to the configuration of the present embodiment, if the heater 300 generates heat, heat transferred to the joining material from an end of the heat generator 302 in the longitudinal direction of the heater 300 is dispersed to the adhesive 500, and thus it is possible to reduce the temperature ramp rate of the joining material.

Therefore, it is possible to reduce cumulative thermal fatigue of the joining material, and prevent cracks or detachment of the flexible sheet.

Effects of Present Embodiment

The following will describe effects of reduction of the temperature ramp rate of the joint portion according to the present embodiment, in comparison with a comparative example. The comparative example has a configuration in which the adhesives 500-1, 500-2, 500-11, and 500-12 of the present embodiment that are provided at longitudinal ends of the heater 300 are omitted.

Figure 5:
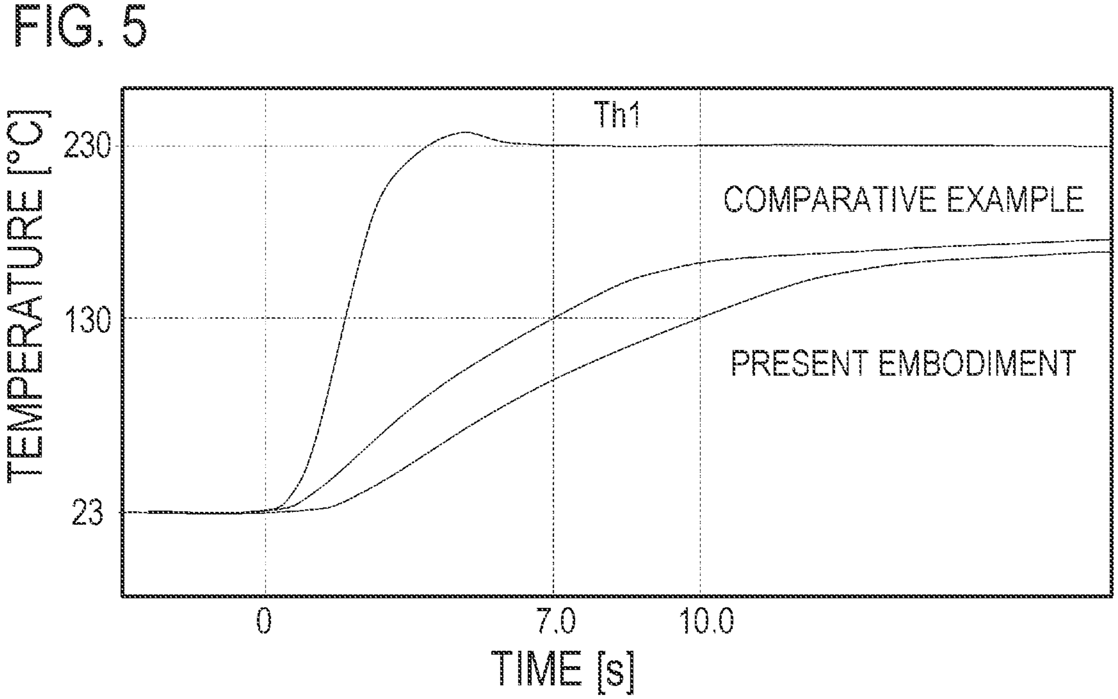
FIG. 5 illustrates temperature transitions of soldered joint portions.

The inventors of the present application conducted verification tests for the present embodiment and the comparative example to check effects of reduction of the temperature ramp rate. In the verification tests, the fixing apparatus 200 was set under the room temperature of 23° C., the thermistors Th1 to Th7 were turned on and were heated to 230° C. for about 7.0 seconds, and the temperatures of the thermistors Th1 to Th7 were adjusted to 230° C. FIG. 5 shows a temperature transition of the thermistor Th1 at this time and temperature transitions of the joining material. Note that the temperature transitions of the joining material are substantially the same between the comparative example and the present embodiment, because the heater 300 has a left-right symmetric structure in the longitudinal direction, and the same positional relationship between the joining material and the peripheral components thereof.

As shown in FIG. 5, the increase in temperature of the joining material is steeper in the comparative example, and the increase in temperature of the joining material is gentler in the present embodiment. Specifically, in the comparative example, it took 7.0 seconds until the temperature of the joining material reached 130° C., but in the present embodiment, it took 10.0 seconds until the temperature reached 130°, and the temperature ramp rate is low. It was considered because by providing the adhesives 500-1 and 500-2, which are the thermal conductive members, heat was transferred also to the adhesives 500-1 and 500-2, and was dispersed before transferred to the joining material 400. Note that, in order to achieve sufficient effects of reduction of the temperature ramp rate, it is desirable that the contact thermal resistance of the thermal conductive member that is in contact with the heater is low. Therefore, as in the present embodiment, an adhesive with high adhesiveness at a contact portion with the heater is particularly effective.

Therefore, according to the configuration of the present embodiment, since the adhesive functions as the thermal conductive member and heat to be transferred to the joining material is dispersed, it is possible to reduce the temperature ramp rate of the joining material that connects the FPC and the electrical contacts of the heater. Accordingly, it is possible to suppress cumulative thermal fatigue of the joining material, thereby preventing occurrence of problems such as cracks in the joint portion or detachment of the flexible sheet. According to the configuration of the present embodiment, neither cracks in the solder nor detachment of the FPC occurred during the product lifetime.

The preferred embodiment of the present invention has been described so far, but the present invention is not limited to the embodiment, and various modifications and changes are possible without departing from the spirit of the invention. Although, in the present embodiment, a plurality of thermal conductive members (adhesive 500) is provided between the heat generator end HE1 and the joining material 400 to achieve sufficient effects of reduction of the temperature ramp rate, the same effects of reduction of the temperature ramp rate can be achieved even when, for example, only one thermal conductive member is provided. In such a configuration, the thermal conductive member may be provided only in the joint region L2 or may be provided only in the intermediate region L3, but larger effects of reduction of increase in temperature of the joining material 400 can be achieved when the thermal conductive member is provided in the intermediate region L3.

Also, in the present embodiment, adhesive is used as the thermal conductive member that is in contact with the heater 300 and extends from the heat generator ends HE1 and HE2 to the joining material, but the configuration for realizing the same effects is not limited to this. For example, instead of the adhesives 500-1, 500-2, 500-11, and 500-12 provided at two outer ends of the heat generator, heat conductive grease may be provided as the thermal conductive member on the heater. Alternatively, instead of the adhesives 500-1, 500-2, 500-11, and 500-12 provided at two outer ends of the heat generator, the heater support member 240 may be in contact with the heater 300, so that part of the heater support member 240 functions as the thermal conductive member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091287, filed on Jun. 6, 2022, which is hereby incorporated by reference herein in its entirety.

What is claimed is:

1. An image heating device configured to convey a recording material and heat an image formed on the recording material, the image heating device comprising:
- a film that is tubular;
- a heater with a heat generator, the heater being elongated in a generatrix direction of the film, and being arranged in an inner space of the film along the generatrix direction of the film;
- a support member that is arranged in the inner space of the film, and supports the heater;
- a roller that is in contact with an outer circumferential surface of the film, and forms a nip portion between the roller and the film, the nip portion being configured to hold the recording material between the roller and the film; and
- a flexible printed circuit electrically connected to the heater by solder,
- wherein the heater is adhered to the support member with an adhesive,
- wherein the heater includes, in the generatrix direction, a first region in which the heat generator is provided, a second region in which the solder is provided, and a third region between the first region and the second region in which neither the heat generator nor the solder is provided,
- wherein with respect to a conveying direction of the recording material perpendicular to the generatrix direction, a surface of the third region of the heater that faces a seat of the support member includes a non-contact region that is not in contact with the support member,
- wherein the adhesive is provided in the non-contact region, and
- wherein with respect to the generatrix direction, the adhesive is provided in at least one of the second region and the third region of the heater.

2. The image heating device according to claim 1, wherein with respect to the generatrix direction, a plurality of the adhesives is provided in a combined region of the second region and the third region.

3. The image heating device according to claim 1, wherein the heater includes: a substrate on which the heat generator is formed, a temperature sensor provided on the substrate, and an electrical contact that is provided on the substrate and is electrically connected to the temperature sensor, and the flexible printed circuit is joined to the electrical contact by the solder.

4. The image heating device according to claim 3, wherein with respect to the generatrix direction, the flexible printed circuit overlaps with the substrate.

5. The image heating device according to claim 1, further comprising a control unit for controlling a temperature of the heat generator, wherein the flexible printed circuit electrically connects the heater and the control unit.

6. An image forming apparatus comprising:

an image forming unit configured to form an image on a recording material; and a fixing unit configured to fix the image formed on the recording material to the recording material, wherein the fixing unit is the image heating device as recited in claim 1.

7. The image heating device according to claim 1, wherein with respect to the conveying direction, two contact regions where the heater and the support member come in contact with each other are provided adjacent to the non-contact region.

8. The image heating device according to claim 7, wherein with respect to the generatrix direction, the two contact regions are provided over an entire region of the heater.

9. An image heating device configured to convey a recording material and heat an image formed on the recording material, the image heating device comprising:

a film that is tubular;

a heater with a heat generator, the heater being elongated in a generatrix direction of the film, and being arranged in an inner space of the film along the generatrix direction of the film;

a support member that is arranged in the inner space of the film, and supports the heater;

a roller that is in contact with an outer circumferential surface of the film, and forms a nip portion between the roller and the film, the nip portion being configured to hold the recording material between the roller and the film; and a flexible printed circuit electrically connected to the heater by solder, wherein a heat conductive grease in contact with the heater and the support member is provided between the heater and the support member, wherein the heater includes, in the generatrix direction, a first region in which the heat generator is provided, a second region in which the solder is provided, and a third region between the first region and the second region in which neither the heat generator nor the solder is provided, wherein with respect to a conveying direction of the recording material perpendicular to the generatrix direction, a surface of the third region of the heater that faces a seat of the support member includes a non-contact region that is not in contact with the support member, wherein the heat conductive grease is provided in the non-contact region, and wherein with respect to the generatrix direction, the heat conductive grease is provided in at least one of the second region and the third region of the heater.

10. The image heating device according to claim 9, wherein the heater includes: a substrate on which the heat generator is formed, a temperature sensor provided on the substrate, and an electrical contact that is provided on the substrate and is electrically connected to the temperature sensor, and the flexible printed circuit is joined to the electrical contact by the solder.

11. The image heating device according to claim 10, wherein with respect to the generatrix direction, the flexible printed circuit overlaps with the substrate.

12. The image heating device according to claim 9, further comprising a control unit for controlling a temperature of the heat generator, wherein the flexible printed circuit electrically connects the heater and the control unit.

13. The image heating device according to claim 9, wherein with respect to the conveying direction, two contact regions where the heater and the support member come in contact with each other are provided adjacent to the non-contact region.

14. The image heating device according to claim 13, wherein with respect to the generatrix direction, the two contact regions are provided over an entire region of the heater.

15. An image forming apparatus comprising:

an image forming unit configured to form an image on a recording material; and a fixing unit configured to fix the image formed on the recording material to the recording material, wherein the fixing unit is the image heating device as recited in claim 9.

* * * * *